United States Patent
Lai et al.

(10) Patent No.: US 12,517,592 B2
(45) Date of Patent: Jan. 6, 2026

(54) WATERPROOF KEYBOARD

(71) Applicant: Primax Electronics Ltd., Taipei (TW)

(72) Inventors: Zheng-Hong Lai, Taipei (TW); Chih-Ho Hsu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 57 days.

(21) Appl. No.: 18/594,396

(22) Filed: Mar. 4, 2024

(65) Prior Publication Data

US 2025/0238086 A1 Jul. 24, 2025

(30) Foreign Application Priority Data

Jan. 19, 2024 (CN) .......................... 202410081493.X

(51) Int. Cl.
*G06F 3/02* (2006.01)

(52) U.S. Cl.
CPC ................... *G06F 3/0202* (2013.01)

(58) Field of Classification Search
None
See application file for complete search history.

(56) References Cited

U.S. PATENT DOCUMENTS

2023/0400931 A1\* 12/2023 Yao ...................... H01H 13/704
2023/0409130 A1\* 12/2023 Shen ..................... G06F 1/1616

\* cited by examiner

*Primary Examiner* — Stephen T. Reed
(74) *Attorney, Agent, or Firm* — KIRTON McCONKIE; Evan R. Witt

(57) ABSTRACT

A waterproof keyboard includes a base plate, a key frame, plural keycaps, a first adhesive layer, plural second adhesive layers and a keyboard film. The key frame is installed on the base plate. The first adhesive layer is installed on a frame top surface. The plural second adhesive layers are disposed on the corresponding keycap top surfaces, respectively. The keyboard film is attached on the first adhesive layer and the plural second adhesive layers. After the keyboard film is subjected to a thermal pressing process, the keyboard film generates at least one concave structure on the frame top surface and plural convex structures on the corresponding keycap top surfaces. The at least one concave structure is attached on the frame top surface through the first adhesive layer. The plural convex structures are respectively attached on the corresponding keycap top surfaces through the corresponding second adhesive layers.

5 Claims, 6 Drawing Sheets

WATERPROOF KEYBOARD

FIELD OF THE INVENTION

The present invention relates to a keyboard, and more particularly to a waterproof keyboard for use with a tablet computer or a mobile information device.

BACKGROUND OF THE INVENTION

A keyboard is one of the most common input devices used with computers. During normal use process of the keyboard, it is easy for water, drink or food to fall onto the keyboard. Consequently, the keyboard is readily damaged or needs to be cleaned. In order to prevent from the above situation, a detachable keyboard film has been developed and introduced into the market. However, most of the existing detachable keyboard films are made of rubber, silicone or any other similar material. This material is hard and inelastic. Consequently, when the keyboard is typed by the user, the user usually feels discomfortable in the fingers, or the pressing feel is poor. Moreover, since the detachable keyboard film only covers the surface of the keyboard, the detachable keyboard film does not have a sharp appearance and is unable to be effectively and fully attached on the structure of the keyboard. Consequently, during the process of typing the keyboard, the detachable keyboard film is prone to the slipping problem and the falling problem. Moreover, since the peripheral region of the detachable keyboard film is not attached on the keyboard, the detachable keyboard film still cannot effectively achieve the dustproof and waterproof functions of the full keyboard.

In order to overcome the above problems, a holster-type keyboard has been developed. However, the keyboard film material of the existing holster-type keyboards is mostly made of textile cloth or synthetic leather. Generally, the hardness and thickness of the above-mentioned material are high, and the hardness and thickness of the above-mentioned material are positively related to the user's pressing feel. Consequently, if the textile cloth or synthetic leather is used, the force and the reaction force during the typing process will be larger, which will easily make the user's fingers feel fatigue and result in the poor typing feel. Furthermore, when the textile cloth or synthetic leather is attached on the keyboard, this material cannot be flatly attached on the surface of the keyboard because of its thickness and hardness. Consequently, the sharpness of its appearance is usually unsatisfactory.

Therefore, it is important to provide an improved waterproof keyboard in order to overcome the drawbacks of the conventional technologies.

SUMMARY OF THE INVENTION

An object of the present invention provides an improved waterproof keyboard.

The other objects and advantages of the present invention will be understood from the disclosed technical features.

In accordance with an aspect of the present invention, a waterproof keyboard is provided. The waterproof keyboard includes a base plate, a key frame, plural keycaps, a first adhesive layer, plural second adhesive layers and a keyboard film. The key frame is installed on the base plate. The key frame includes a frame body and plural openings. The plural openings run through the frame body. The frame body has a frame top surface. The plural keycaps are penetrated through the plural openings, respectively. The plural keycaps have respective keycap top surfaces. The first adhesive layer is installed on the frame top surface. The plural second adhesive layers are disposed on the corresponding keycap top surfaces, respectively. The keyboard film is attached on the first adhesive layer and the plural second adhesive layers. After the keyboard film is subjected to a thermal pressing process, the keyboard film generates at least one concave structure on the frame top surface and plural convex structures on the corresponding keycap top surfaces. The at least one concave structure is attached on the frame top surface through the first adhesive layer. The plural convex structures are respectively attached on the corresponding keycap top surfaces through the corresponding second adhesive layers.

In an embodiment, the keyboard film includes a light-transmissible layer and at least one light-shielding layer. The at least one light-shielding layer is combined with and disposed on a top surface of the light-transmissible layer.

In an embodiment, the keyboard film has a light-transmissible pattern. The light-transmissible pattern is formed after the at least one light-shielding layer is hollowed out.

In an embodiment, each of the light-transmissible layer and the at least one light-shielding layer is made of polyurethane (PU) or thermoplastic polyurethane (TPU).

In an embodiment, an orthographic projection region of each second adhesive layer is within an orthographic projection region of the corresponding opening.

In an embodiment, the orthographic projection region of the opening has a first side, a second side, a third side and a fourth side. In the orthographic projection region of the opening, the first side and the third side are opposed to each other, the second side and the fourth side are opposed to each other, the first side is arranged adjacent to the second side and the fourth side, the second side is arranged adjacent to the first side and the third side, the third side is arranged adjacent to the second side and the fourth side, and the fourth side is arranged adjacent to the first side and the third side.

In an embodiment, the orthographic projection region of the second adhesive layer has a first side, a second side, a third side and a fourth side. In the orthographic projection region of the second adhesive layer, the first side and the third side are opposed to each other, the second side and the fourth side are opposed to each other, the first side is arranged adjacent to the second side and the fourth side, the second side is arranged adjacent to the first side and the third side, the third side is arranged adjacent to the second side and the fourth side, and the fourth side is arranged adjacent to the first side and the third side.

In an embodiment, the first side of the orthographic projection region of the opening is located near the first side of the orthographic projection region of the second adhesive layer, and there is a first gap between the first side of the orthographic projection region of the opening and the first side of the orthographic projection region of the second adhesive layer. The second side of the orthographic projection region of the opening is located near the second side of the orthographic projection region of the second adhesive layer, and there is a first gap between the second side of the orthographic projection region of the opening and the second side of the orthographic projection region of the second adhesive layer. The third side of the orthographic projection region of the opening is located near the third side of the orthographic projection region of the second adhesive layer, and there is a first gap between the third side of the orthographic projection region of the opening and the third side of the orthographic projection region of the second adhesive layer. The fourth side of the orthographic projection region of the opening is located near the fourth side of the orthographic projection region of the second adhesive layer, and there is a first gap between the fourth side of the orthographic projection region of the opening and the fourth side of the orthographic projection region of the second adhesive layer.

In an embodiment, the keyboard film has a thickness larger than zero, the first gap is not smaller than twice the thickness, the second gap is not smaller than twice the thickness, the third gap is not smaller than twice the thickness, and the fourth gap is not smaller than twice the thickness.

In an embodiment, each of the first adhesive layer and the plural second adhesive layers is a hot melt adhesive layer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1A:
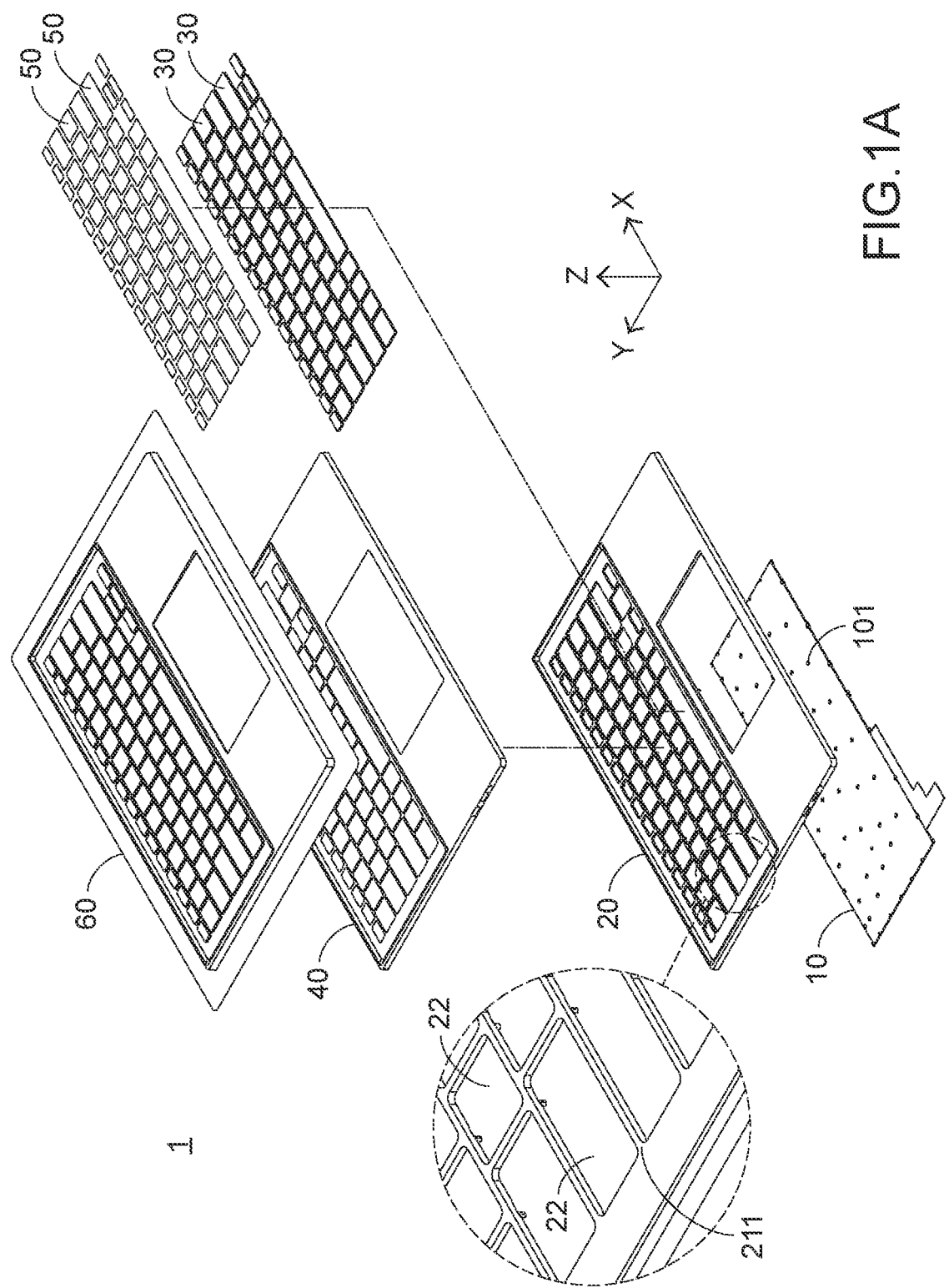
FIGS. 1A and 1B are schematic exploded view illustrating the structure of a waterproof keyboard according to an embodiment of the present invention.
Figure 1B:
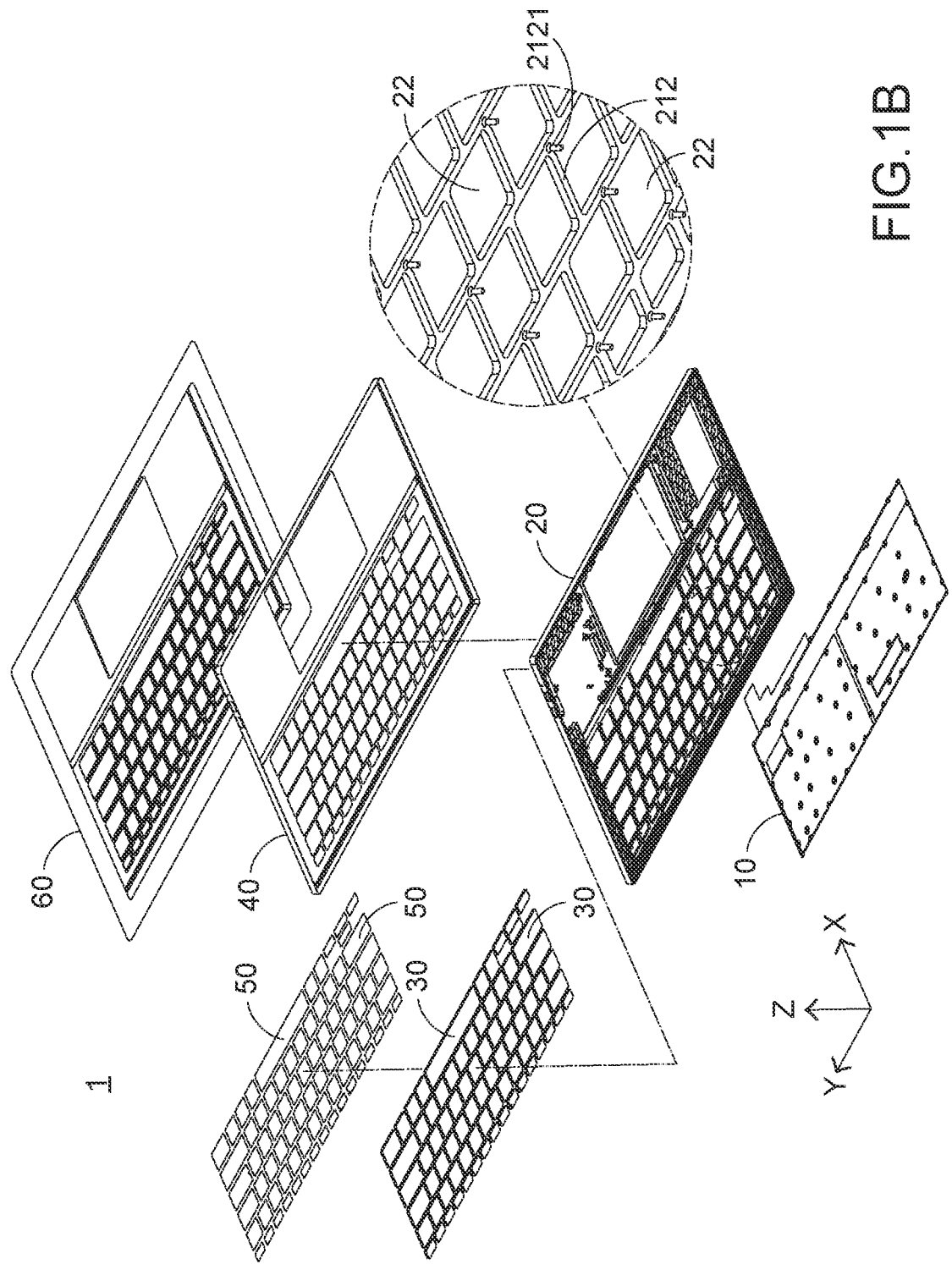
Figure 2:
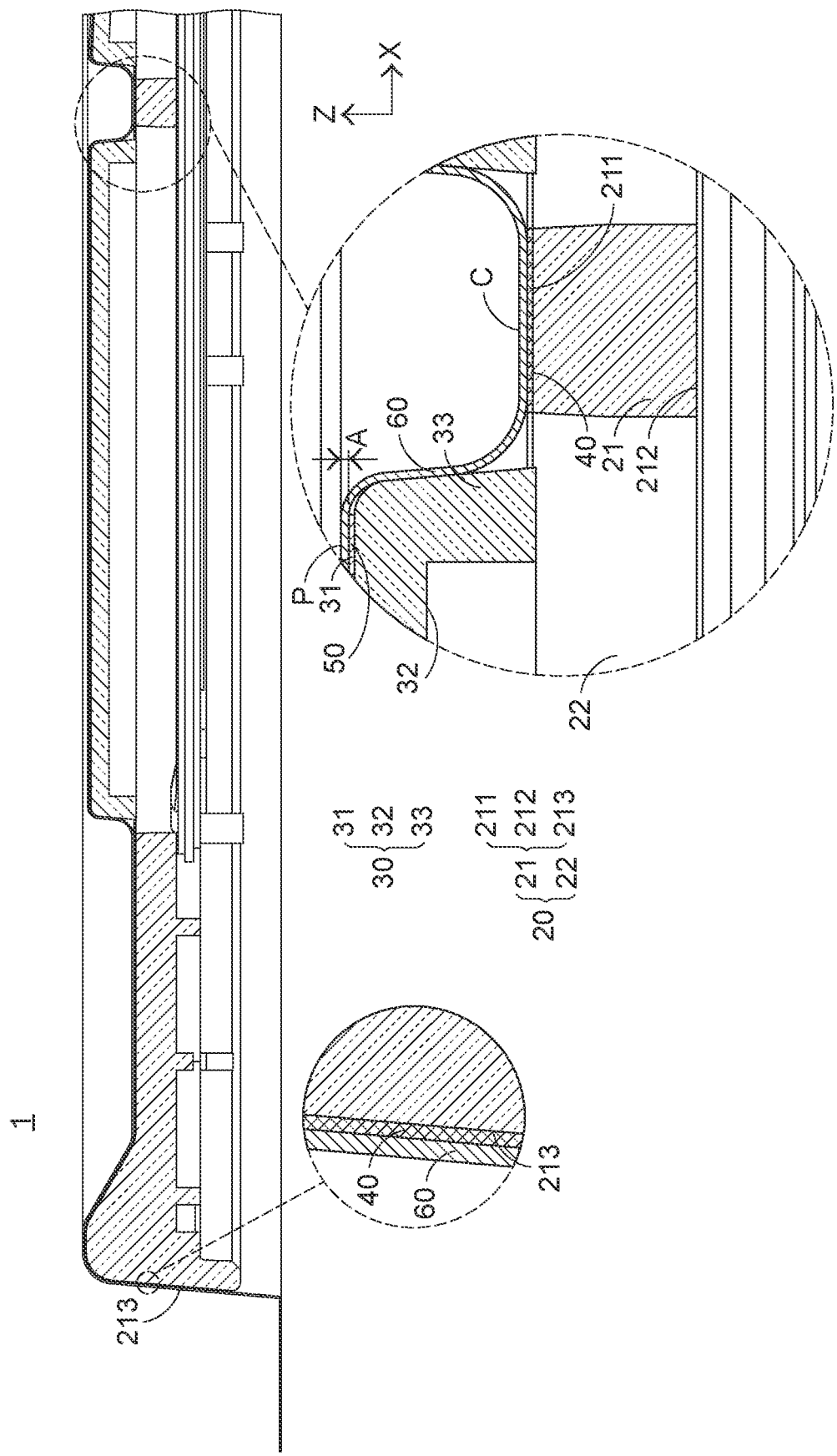
FIG. 2 is a schematic cross-sectional view illustrating a portion of the waterproof keyboard according to the embodiment of the present invention.
Figure 3:
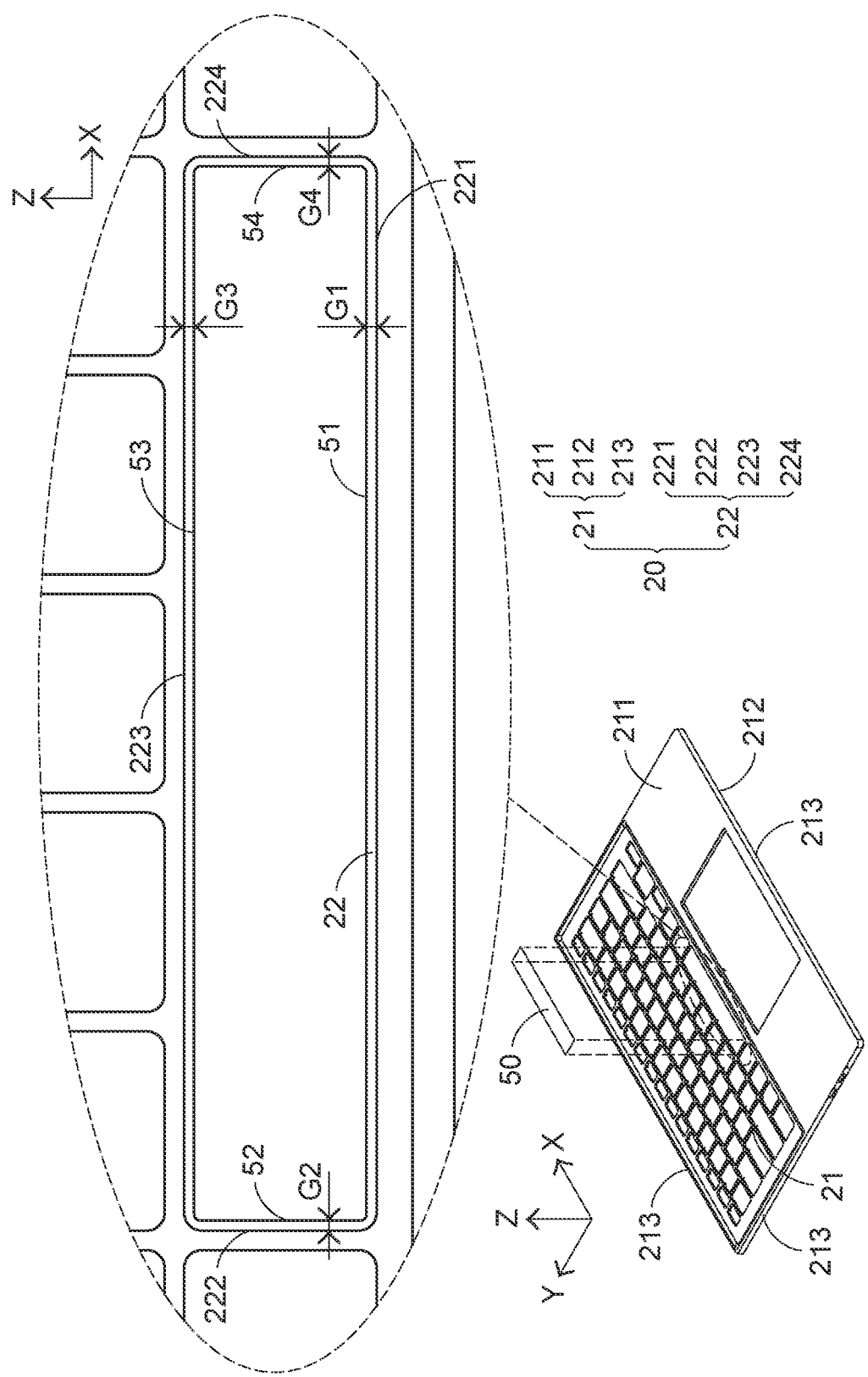
FIG. 3 is a schematic orthogonal projection view illustrating the relationship between an opening of a key frame and a second adhesive layer in the waterproof keyboard according to the embodiment of the present invention.
Figure 4:
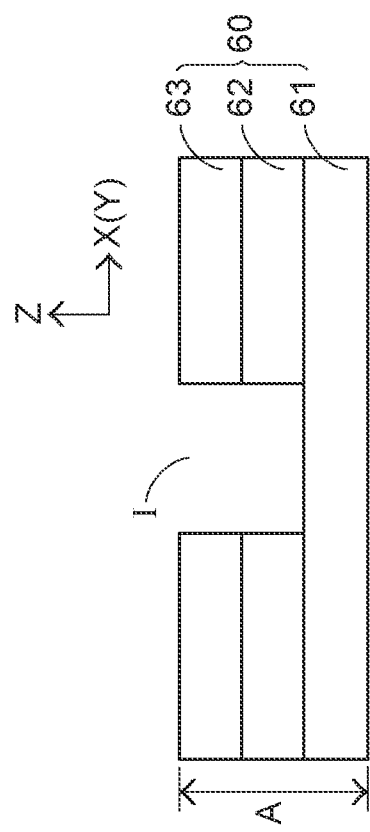
FIG. 4 is a schematic cross-sectional view illustrating the stack structure of a keyboard film in the waterproof keyboard according to the embodiment of the present invention.
Figure 5A:
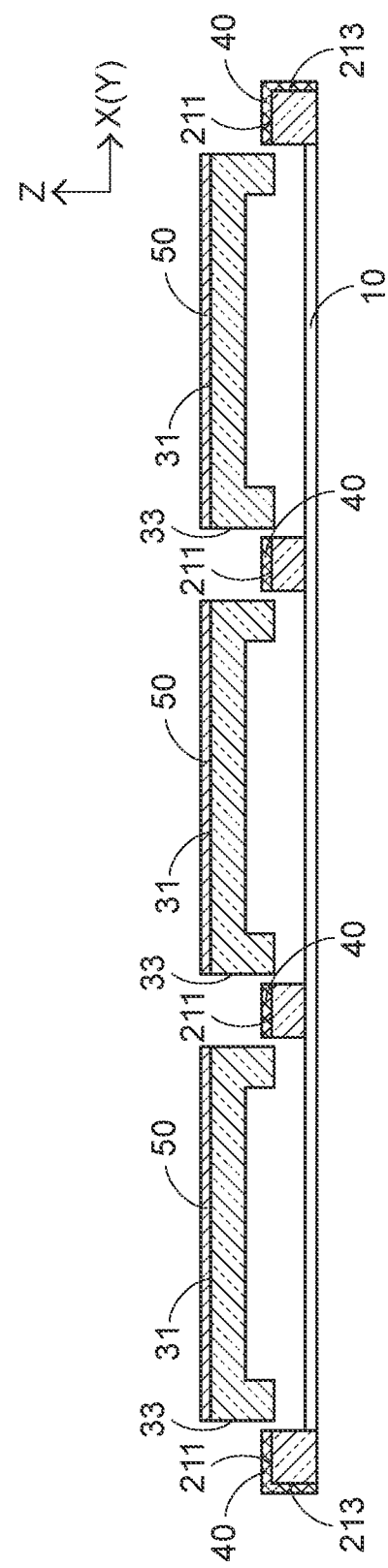
FIGS. 5A, 5B and 5C are schematic cross-sectional views illustrating the steps of a method for manufacturing the waterproof keyboard according to the embodiment of the present invention.
Figure 5B:
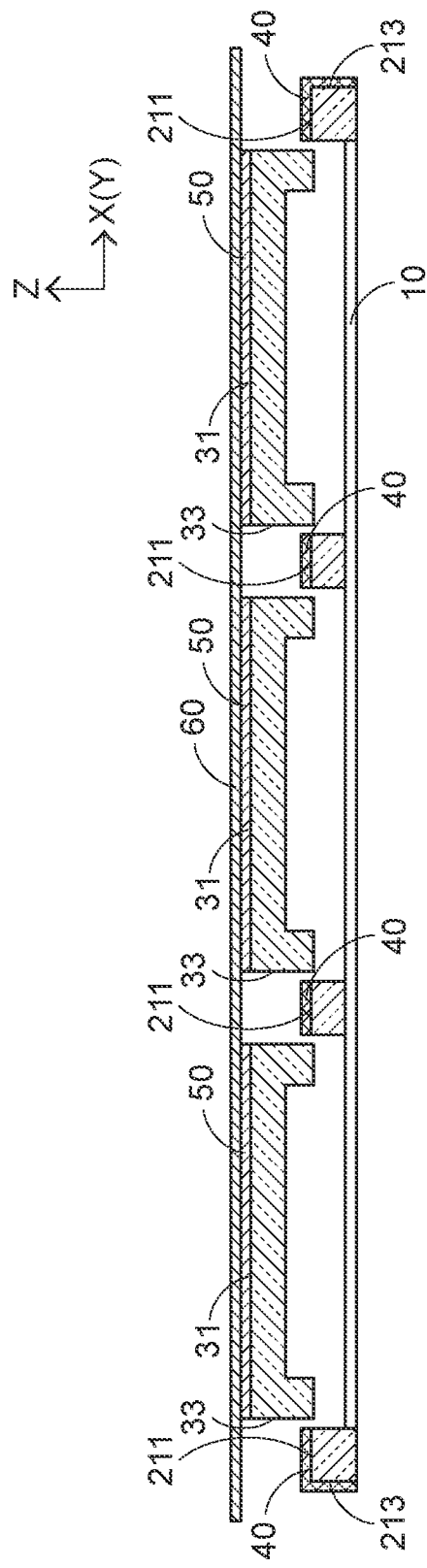
Figure 5C:
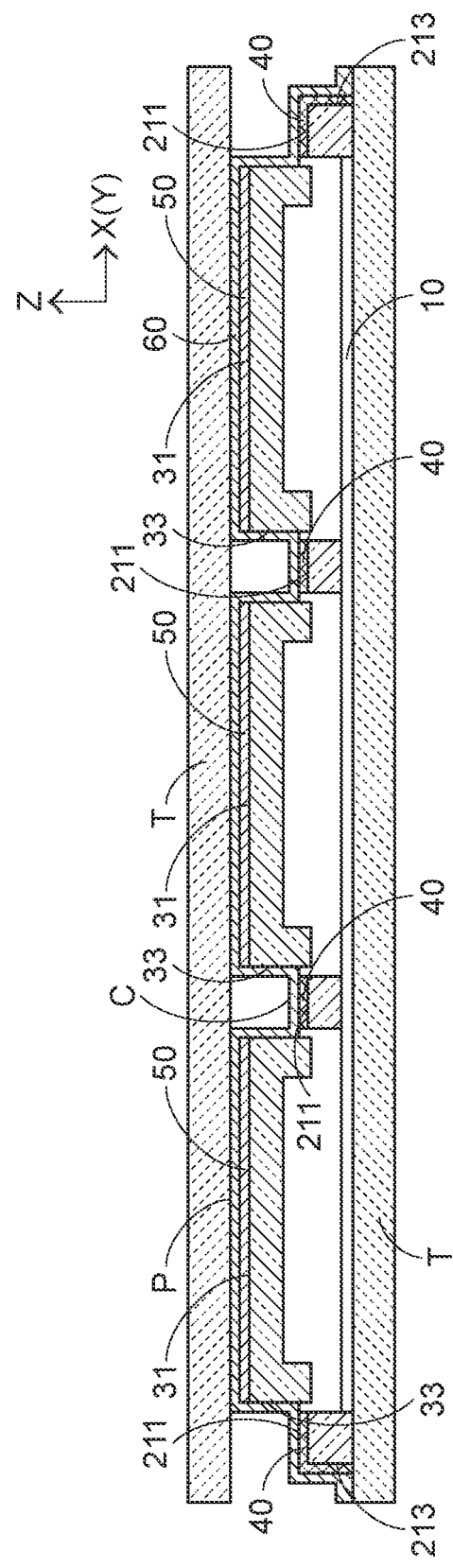

FIGS. 1A and 1B are schematic exploded view illustrating the structure of a waterproof keyboard 1 according to an embodiment of the present invention. FIG. 2 is a schematic cross-sectional view illustrating a portion of the waterproof keyboard 1 according to the embodiment of the present invention. FIG. 3 is a schematic orthogonal projection view illustrating the relationship between an opening 22 of a key frame 20 and a second adhesive layer 50 in the waterproof keyboard 1 according to the embodiment of the present invention. FIG. 4 is a schematic cross-sectional view illustrating the stack structure of a keyboard film 60 in the waterproof keyboard according to the embodiment of the present invention. FIGS. 5A, 5B and 5C are schematic cross-sectional views illustrating the steps of a method for manufacturing the waterproof keyboard 1 according to the embodiment of the present invention.

Please refer to FIG. 1A, FIG. 1B and FIG. 2. In an embodiment of the present invention, the waterproof keyboard 1 comprises a base plate 10, a key frame 20, plural keycaps 30, a first adhesive layer 40, plural second adhesive layers 50 and a keyboard film 60.

The key frame 20 is installed on the base plate 10. The key frame 20 comprises a frame body 21 and plural openings 22. The plural openings 22 run through the frame body 21. In addition, the frame body 21 has a frame top surface 211.

The plural keycaps 30 are respectively penetrated through the plural openings 22. In addition, each of the plural keycaps 30 has a keycap top surface 31.

The first adhesive layer 40 is installed on the frame top surface 211. The appearance and the number of the first adhesive layer 40 match the appearance and the number of the key frame 20.

The plural second adhesive layers 50 are respectively disposed on the corresponding keycap top surfaces 31. In addition, the number of the second adhesive layer 50 matches the number of the keycap top surfaces 31. Especially, the shape of each second adhesive layer 50 is identical to the shape of the corresponding keycap top surface 31. For example, in case that the waterproof keyboard 1 has twenty keycaps 30 (i.e., twenty keycap top surfaces 31), the waterproof keyboard 1 is also equipped with twenty second adhesive layers 50. In case that the keycap top surface 31 is rectangular, the corresponding second adhesive layer 50 also has a rectangular shape.

The keyboard film 60 is attached on the first adhesive layer 40 and the plural second adhesive layers 50. After the keyboard film 60 is subjected to a thermal pressing process, the keyboard film 60 generates at least one concave structure C and plural convex structures P. The at least one concave structure C is directly formed on the frame top surface 211. The plural convex structures P are respectively formed on the corresponding keycap top surfaces 31. In addition, the at least one concave structure C is attached on the frame top surface 211 through the first adhesive layer 40, and the plural convex structures P are respectively attached on the corresponding keycap top surfaces 31 through the corresponding second adhesive layers 50.

The components of the waterproof keyboard 1 will be described in more details as follows.

Please refer to FIG. 1A and FIG. 1B again. The appearance of the base plate 10 is substantially a rectangular plate. Preferably but not exclusively, the base plate 10 is a printed circuit board, a flexible printed circuit (FPC) of a membrane keyboard, or a general carrier board without a circuit. The base plate 10 comprises at least one positioning hole 101. The at least one positioning hole 101 runs through the base plate 10. Preferably but not exclusively, the positioning hole 101 has a circular or elliptical shape. Moreover, at least one light source (not shown) is installed on a top surface of the base plate 10. Preferably but not exclusively, the light source is a light emitting diode, a small light bulb, a small cold cathode tube or a luminescent element. In an embodiment, the waterproof keyboard 1 is equipped with plural light sources corresponding to plural keycaps 30. That is, each light source corresponds to one keycap 30, and each light source is located under the corresponding keycap 30. In another embodiment, the plural light sources are evenly distributed on the base plate 10, but the number of the light sources and the positions of the light sources do not match the plural keycaps 30 in a one-to-one manner. In an embodiment, the waterproof keyboard 1 is additionally equipped with a light guide plate (not shown). The light beams emitted by the light sources are guided by the light guide plate. Consequently, the plural keycaps 30 can receive the light beams evenly.

Please also refer to FIG. 2 and FIG. 3. The appearance of the key frame 20 is substantially a rectangular plate. The key frame 20 comprises the frame body 21 and the plural openings 22. The plural keycaps 30 are respectively penetrated through the plural openings 22. Preferably but not exclusively, the frame body 21 is produced by using a metal die-casting process or a plastic injection molding process. In addition, the frame body 21 comprises the frame top surface 211, a frame bottom surface 212 and plural frame outer surfaces 213. The frame top surface 211 and the frame bottom surface 212 are opposed to each other. The frame bottom surface 212 is located at the side of the frame body 21 close to the base plate 10. The frame top surface 211 is located at the side of the frame body 21 away from the base plate 10. The plural frame outer surfaces 213 are located at the periphery regions of the frame body 21. In addition, the plural frame outer surfaces 213 are connected with the frame top surface 211 and the frame bottom surface 212. In an embodiment, the frame body 21 comprises four frame outer surfaces 213.

As shown in FIG. 1B, the frame body 21 further comprises at least one positioning post 2121. The at least one positioning post 2121 is formed on the frame bottom surface 212. In an embodiment, the at least one positioning post 2121 is protruded from the frame bottom surface 212 in a negative direction of the Z axis. That is, the at least one positioning post 2121 is protruded in the direction toward the base plate 10. The at least one positioning post 2121 is penetrated through the corresponding positioning hole 101. Consequently, the key frame 20 and the base plate 10 can be fixed on each other.

In an embodiment, the plural openings 22 are rectangular. It is noted that the shapes of the openings 22 are not restricted. For example, each of the plural openings 22 has a square shape or a rectangular shape. In addition, the plural openings 22 run through the frame body 21. The orthographic projection region of the opening 22 has a first side 221, a second side 222, a third side 223 and a fourth side 224. The first side 221 and the third side 223 are opposed to each other. The second side 222 and the fourth side 224 are opposed to each other. The first side 221 is arranged adjacent to the second side 222 and the fourth side 224. The second side 222 is arranged adjacent to the first side 221 and the third side 223. The third side 223 is arranged adjacent to the second side 222 and the fourth side 224. The fourth side 224 is arranged adjacent to the first side 221 and the third side 223.

Please refer to FIG. 1A, FIG. 1B and FIG. 2 again. Each of the plural keycaps 30 comprises a keycap top surface 31, a keycap inner surface 32 and a keycap edge 33. The keycap top surface 31 and the keycap inner surface 32 are opposed to each other. The keycap inner surface 32 is located at the side of the keycap 30 close to the base plate 10. The keycap top surface 31 is located at the side of the keycap 30 away from the base plate 10. The keycap inner surface 32 is provided with plural hooks (not shown). Moreover, the keycap inner surface 32 is connected with the base plate 10 through plural scissors-type connecting mechanisms (not shown). Consequently, each keycap 30 can be moved upwardly or downwardly relative to the base plate 10 in the vertical direction. That is, each keycap 30 is moved back and forth in the Z axis direction. The keycap edge 33 is a protrusion structure that is protruded from the periphery region of the keycap inner surface 32 in the negative direction of the Z axis. The included angle between the keycap edge 33 and the keycap inner surface 32 is approximately 90 degrees. In an embodiment, the plural keycaps 30 are light-transmissible keycaps 30. For example, the keycap 30 is made of light-transmissible plastic material. Consequently, the entire of the keycap 30 has the light-transmissible property. Alternatively, a light-transmissible structure is embedded within a partial area of the keycap 30. Consequently, the partial area of the keycap 30 has the light-transmissible property.

Please refer to FIG. 1A, FIG. 1B and FIG. 2 again. The first adhesive layer 40 is installed on the frame top surface 211 and the plural frame outer surfaces 213. In other words, the first adhesive layer 40 generally covers the frame top surface 211 and the plural frame outer surfaces 213, and the appearance of the first adhesive layer 40 matches the appearance of the key frame 20. In an embodiment, the first adhesive layer 40 is a hot melt adhesive layer.

Please refer to FIGS. 1A and 3. The plural second adhesive layers 50 are installed on the plural keycap top surfaces 31. In other words, the plural second adhesive layers 50 generally cover the plural keycap top surfaces 31. In an embodiment, the second adhesive layer 50 is a hot melt adhesive layer. The area of each second adhesive layer 50 is equal to the area of the corresponding keycap top surface 31. In addition, the total area of the plural second adhesive layers 50 is equal to the sum of the areas of the plural keycap top surfaces 31. Preferably but not exclusively, the second adhesive layer 50 is rectangular. It is noted that the shape of the second adhesive layer 50 is not restricted. For example, each of the plural second adhesive layers 50 has a square shape or a rectangular.

The orthographic projection region of each second adhesive layer 50 has a first side 51, a second side 52, a third side 53 and a fourth side 54. The first side 51 and the third side 53 are opposed to each other. The second side 52 and the fourth side 54 are opposed to each other. The first side 51 is arranged adjacent to the second side 52 and the fourth side 54. The second side 52 is arranged adjacent to the first side 51 and the third side 53. The third side 53 is arranged adjacent to the second side 52 and the fourth side 54. The fourth side 54 is arranged adjacent to the first side 51 and the third side 53. In addition, all side of the orthographic projection region of each second adhesive layer 50 are aligned with the corresponding sides of the orthographic projection region of the corresponding opening 22. That is, the first side 51 of the orthographic projection region of the second adhesive layer 50 is aligned with and located near the first side 221 of the orthographic projection region of the corresponding opening 22, the second side 52 of the orthographic projection region of the second adhesive layer 50 is aligned with and located near the second side 222 of the orthographic projection region of the corresponding opening 22, the third side 53 of the orthographic projection region of the second adhesive layer 50 is aligned with and located near the third side 223 of the orthographic projection region of the corresponding opening 22, and the fourth side 54 of the orthographic projection region of the second adhesive layer 50 is aligned with and located near the fourth side 224 of the orthographic projection region of the corresponding opening 22. In addition, the orthographic projection region of the second adhesive layer 50 is within the orthographic projection region of the corresponding opening 22. That is, the area of the orthographic projection region of the second adhesive layer 50 is smaller than the area of the orthographic projection region of the corresponding opening 22. In other words, there is a first gap G1 between the first side 51 of the orthographic projection region of the second adhesive layer 50 and the first side 221 of the orthographic projection region of the corresponding opening 22. Similarly, there is a second gap G2 between the second side 52 of the orthographic projection region of the second adhesive layer 50 and the second side 222 of the orthographic projection region of the corresponding opening 22. Similarly, there is a third gap G3 between the third side 53 of the orthographic projection region of the second adhesive layer 50 and the third side 223 of the orthographic projection region of the corresponding opening 22. Similarly, there is a fourth gap G4 between the fourth side 54 of the orthographic projection region of the second adhesive layer 50 and the fourth side 224 of the orthographic projection region of the corresponding opening 22.

Please also refer to FIG. 4. In an embodiment, the keyboard film 60 comprises a light-transmissible layer 61, a first light-shielding layer 62 and a second light-shielding layer 63. The light-transmissible layer 61 is located near the keycap top surfaces 31. The first light-shielding layer 62 is combined with and disposed on the top surface of the light-transmissible layer 61. The second light-shielding layer 63 is combined with the top surface of the first light-shielding layer 62. In this context, the "top side" indicates the positive direction of the Z axis.

The light-transmissible layer 61 is made of a thermoplastic polymer material, which includes but is not limited to polyurethane (PU) or thermoplastic polyurethane (TPU). The first light-shielding layer 62 is made of a thermoplastic polymer material, which includes but is not limited to polyurethane (PU) or thermoplastic polyurethane (TPU). The second light-shielding layer 63 is made of a thermoplastic polymer material, which includes but is not limited to polyurethane (PU) or thermoplastic polyurethane (TPU).

In an embodiment, the thickness of the light-transmissible layer 61 is 0.01 mm, the thickness of the first light-shielding layer 62 is 0.01 mm, and the thickness of the second light-shielding layer 63 is 0.01 mm. The light-transmissible layer 61 is transparent or white. Preferably but not exclusively, the color of the first light-shielding layer 62 is black or gray. Preferably but not exclusively, the color of the second light-shielding layer 63 is black or gray. In addition, the colors of the first light-shielding layer 62 and the second light-shielding layer 63 may be varied according to the appearance of the product.

Furthermore, after the keyboard film 60 is subjected to a laser engraving process, a portion of the first light-shielding layer 62 or the second light-shielding layer 63 is hollowed out. Consequently, a light-transmissible pattern I is formed. Preferably but not exclusively, the light-transmissible pattern I is a number pattern, a Chinese character pattern, an English letter pattern or a punctuation mark pattern.

In an embodiment, the keyboard film 60 has a thickness A. The thickness A is greater than 0. For example, the thickness A is in the range between 0.02 mm and 0.15 mm.

In an embodiment, the gap G1, G2, G3 or G4 between each side of the orthographic projection region of the second adhesive layer 50 and the corresponding side of the orthographic projection region of the corresponding opening 22 is not smaller than the twice the thickness A. That is, each of the first gap G1, the second gap G2, the third gap G3 and the fourth gap G4 needs to be greater than or equal to twice the thickness A. For example, in case that the thickness A of the keyboard film 60 is 0.05 mm, each of the first gap G1, the second gap G2, the third gap G3 and the fourth gap G4 is not smaller than 0.10 mm. Due to the above relationship between each gap and the thickness A of the keyboard film 60, the following benefits will be achieved. For example, when the waterproof keyboard 1 is typed by the user and the keycap 30 is moved in the negative direction of the Z axis to result in the deformation of the keyboard film 60, a material extrusion problem caused in the region between the keycap 30 and the key frame 20 will be avoided. Consequently, the typing feel will be enhanced.

A process of producing the waterproof keyboard 1 will be described in more details as follows.

Please refer to FIG. 5A. Firstly, the first adhesive layer 40 is placed over the frame top surface 211 and the plural frame outer surfaces 213, and the plural second adhesive layers 50 are located over the plural keycap top surfaces 31.

Please refer to FIG. 5B. Then, a keyboard film 60 to be formed is placed over the first adhesive layer 40 and the second adhesive layer 50.

Please refer to FIG. 5C. Then, the keyboard film 60 is directly heat-pressed on the frame top surface 211 and the plural keycap top surfaces 31 through a hot-pressing fixture T. After the keyboard film 60 is heated, plural convex structures P are respectively formed on the corresponding keycap top surfaces 31, and at least one concave structure C is directly formed on the frame top surface 211 along the contours of the keycap 31, the keycap edge 33 and the frame top surface 211. The at least one concave structure C of the formed keyboard film 60 is attached on the frame top surface 211 through the first adhesive layer 40, and the plural convex structures P are attached on the plural keycap top surfaces 31 through the plural keycap top surfaces 31.

In another embodiment, the bottom surface of the keyboard film 60 after being heated is further extended along the contours of the plural frame outer surfaces 213. Consequently, the keyboard film 60 is attached on the plural frame outer surfaces 213 through the first adhesive layer 40. This approach has the following benefits. For example, since the plural convex structures P and the at least one concave structure C of the keyboard film 60 are directly formed on the keycaps 30 and the key frame 20, the process of forming the keyboard film 60 and the process of attaching the keyboard film 60 on the keycaps 30 and the key frame 20 can be combined and simplified. In addition, the keyboard film 60 can be attached on the keycaps 30 and the key frame 20 more closely without causing any tolerances.

From the above descriptions, the waterproof keyboard 1 of the present invention at least has the following benefits:

Firstly, each of the light-transmissible layer 61, the first light-shielding layer 62 and the second light-shielding layer 63 in the keyboard film 60 is made of the thermoplastic polymer material. This material has the advantages of high ductility and small thickness, which helps to reduce the overall thickness of the waterproof keyboard 1 and improve the user's feel when typing the keycap 30.

Secondly, since each of the light-transmissible layer 61, the first light-shielding layer 62 and the second light-shielding layer 63 in the keyboard film 60 is made of the thermoplastic polymer material, the bonding strength between the layers is extremely high, and it is not necessary to provide an additional protective layer to protect the light-transmissible pattern I.

Thirdly, the keyboard film 60 are attached on the key frame 20 and the keycaps 30. Since the keyboard surface is covered by the keyboard film 60 more completely, the good waterproof and dustproof purpose can be achieved.

Fourthly, the light-transmissible pattern I is formed by hollowing out the first light-shielding layer 62 or the second light-shielding layer 63. Consequently, the bonding surface between the light-transmissible layer 61 and the keycap top surfaces 31 is a complete plane. Moreover, since there will be no step difference in the second adhesive layer 50, no bubbles are generated in the keycap top surface 31.

Fifthly, the relationship between the thickness A of the keyboard film 60 and the gap G1, G2, G3 or G4 (i.e., the between each side 221, 222, 223 or 224 of the orthographic projection region of the second adhesive layer 50 and the corresponding side 51, 52, 53 or 54 of the orthographic projection region of the corresponding opening 22) is specially designed. Consequently, when the keyboard film 60 is pressed, the material extrusion problem will be avoided. In this way, the typing feel will be enhanced, and the sharpness of the waterproof keyboard 1 of the appearance will be increased.

Sixthly, the keyboard film 60 is installed on the keycap top surfaces 31 and the frame top surface 211, and the plural convex structures P and the at least one concave structure C are directly formed according to the contours of the keycap 31 and the frame top surface 211. Consequently, the tolerance between the plural convex structures P and the at least one concave structure C of the keyboard film 60 and the keycaps 30 and the key frame 20 will be reduced. In this way, the keyboard film 60 can be flatly attached onto the surface of the keyboard.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A waterproof keyboard, comprising:
   a base plate;
   a key frame installed on the base plate, wherein the key frame comprises a frame body and plural openings, the plural openings run through the frame body, and the frame body has a frame top surface;
   plural keycaps penetrated through the plural openings, respectively, wherein the plural keycaps have respective keycap top surfaces;
   a first adhesive layer installed on the frame top surface;
   plural second adhesive layers disposed on the corresponding keycap top surfaces, respectively; and
   a keyboard film attached on the first adhesive layer and the plural second adhesive layers,
   wherein after the keyboard film is subjected to a thermal pressing process, the keyboard film generates at least one concave structure on the frame top surface and plural convex structures on the corresponding keycap top surfaces,
   wherein the at least one concave structure is attached on the frame top surface through the first adhesive layer, and the plural convex structures are respectively attached on the corresponding keycap top surfaces through the corresponding second adhesive layers,
   wherein an orthographic projection region of each second adhesive layer is within an orthographic projection region of the corresponding opening,
   wherein the orthographic projection region of the opening has a first side, a second side, a third side and a fourth side, wherein in the orthographic projection region of the opening, the first side and the third side are opposed to each other, the second side and the fourth side are opposed to each other, the first side is arranged adjacent to the second side and the fourth side, the second side is arranged adjacent to the first side and the third side, the third side is arranged adjacent to the second side and the fourth side, and the fourth side is arranged adjacent to the first side and the third side,
   wherein the orthographic projection region of the second adhesive layer has a first side, a second side, a third side and a fourth side, wherein in the orthographic projection region of the second adhesive layer, the first side and the third side are opposed to each other, the second side and the fourth side are opposed to each other, the first side is arranged adjacent to the second side and the fourth side, the second side is arranged adjacent to the first side and the third side, the third side is arranged adjacent to the second side and the fourth side, and the fourth side is arranged adjacent to the first side and the third side,
   wherein the first side of the orthographic projection region of the opening is located near the first side of the orthographic projection region of the second adhesive layer, and there is a first gap between the first side of the orthographic projection region of the opening and the first side of the orthographic projection region of the second adhesive layer, wherein the second side of the orthographic projection region of the opening is located near the second side of the orthographic projection region of the second adhesive layer, and there is a second side gap between the second side of the orthographic projection region of the opening and the second side of the orthographic projection region of the second adhesive layer, wherein the third side of the orthographic projection region of the opening is located near the third side of the orthographic projection region of the second adhesive layer, and there is a third gap between the third side of the orthographic projection region of the opening and the third side of the orthographic projection region of the second adhesive layer, wherein the fourth side of e orthographic projection region of the opening is located near the fourth side of the orthographic projection region of the second adhesive layer, and there is a fourth gap between the fourth side of the orthographic projection region of the opening and the fourth side of the orthographic projection region of the second adhesive layer,
   wherein the keyboard film has a thickness larger than zero, the first gap is not smaller than twice the thickness, the second gap is not smaller than twice the thickness, the third gap is not smaller than twice the thickness, and the fourth gap is not smaller than twice the thickness.

2. The waterproof keyboard according to claim 1, wherein the keyboard film comprises a light-transmissible layer and at least one light-shielding layer, wherein the at least one light-shielding layer is combined with and disposed on a top surface of the light-transmissible layer.

3. The waterproof keyboard according to claim 2, wherein the keyboard film has a light-transmissible pattern, wherein the light-transmissible pattern is formed after a portion of the at least one light-shielding layer is hollowed out.

4. The waterproof keyboard according to claim 2, wherein each of the light-transmissible layer and the at least one light-shielding layer is made of polyurethane (PU) or thermoplastic polyurethane (TPU).

5. The waterproof keyboard according to claim 1, wherein each of the first adhesive layer and the plural second adhesive layers is a hot melt adhesive layer.

* * * * *